United States Patent
Xie et al.

(10) Patent No.: US 6,525,726 B1
(45) Date of Patent: Feb. 25, 2003

(54) METHOD AND APPARATUS FOR ADAPTIVE HIERARCHICAL VISIBILITY IN A TILED THREE-DIMENSIONAL GRAPHICS ARCHITECTURE

(75) Inventors: Feng Xie, Sunnyvale, CA (US); Michael J. Shantz, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/432,134

(22) Filed: Nov. 2, 1999

(51) Int. Cl.[7] .............................................. G06T 15/40
(52) U.S. Cl. ....................................... 345/421; 345/422
(58) Field of Search .................................. 345/421, 422

(56) References Cited

U.S. PATENT DOCUMENTS

| | | | | |
|---|---|---|---|---|
| 5,579,455 A | * | 11/1996 | Greene et al. ............... | 345/419 |
| 5,596,686 A | * | 1/1997 | Duluk, Jr. ................... | 345/422 |
| 6,052,125 A | * | 4/2000 | Gardiner et al. ............ | 345/421 |
| 6,259,452 B1 | * | 7/2001 | Coorg et al. .................... | 19/96 |
| 6,300,965 B1 | * | 10/2001 | Sowizral et al. ............ | 345/622 |
| 6,348,919 B1 | * | 2/2002 | Murphy ....................... | 345/421 |
| 6,362,818 B1 | * | 3/2002 | Gardiner et al. ............ | 345/421 |
| 6,366,283 B1 | * | 4/2002 | Tampieri .................... | 345/426 |

OTHER PUBLICATIONS

Article Titled "Hierarchical Polygon Tiling with Coverage Masks" by Ned Greene, Apple Computer, Proceedings of the 23rd annual conference on Computer Graphics and Interactive Techniques, Aug. 1996.*

Article Titled "Preprocessing Occlusion For Real–Time Selective Refinement" by Fei–Ah Law et al., National University of Singapore, Proceedings of the Symposium in Interactive 3D Graphics, Apr. 1999.*

Article Titled "Visibility Preprocessing for Interactive Walk-throughs" by Seth J. Teller et al., University of California at Berkeley, ACM SIGGRAPH Computer Graphics, Proceedings of the 18th annual conference on Computer Graphics and Interactive Techniques.*

* cited by examiner

Primary Examiner—Mark Zimmerman
Assistant Examiner—Enrique L. Santiago
(74) Attorney, Agent, or Firm—Schwegman, Lundberg, Woessner & Kluth, P.A.

(57) ABSTRACT

A data processing system providing high performance three-dimensional graphics includes at least one system processor, chipset core logic, a graphics processor, and a Z-buffer. In one embodiment an adaptive hierarchical visibility (AHV) method performs occlusion-culling in a tiled 3D graphics hardware architecture. Polygon bins for each tile are bucket-sorted in order of increasing depth Z. Polygon bins are rendered starting with the bin closest to the viewer. After some number of bins are rendered, a single layer, hierarchical Z-buffer (HZ) may be constructed from the Z-buffer thus far accumulated for the rendered bins, if it would be cost effective to do so. Subsequent bins are rendered by first testing their polygons against the HZ buffer to see if they are hidden. Also described are an integrated circuit for implementing the AHV algorithm, and a computer-readable medium storing a data structure for implementing the AHV method and apparatus.

24 Claims, 6 Drawing Sheets

METHOD AND APPARATUS FOR ADAPTIVE HIERARCHICAL VISIBILITY IN A TILED THREE-DIMENSIONAL GRAPHICS ARCHITECTURE

TECHNICAL FIELD

The invention relates to computer graphics and, in particular, to the culling of occluded polygons from a scene being rendered in a tiled, three-dimensional computer graphics architecture.

BACKGROUND

In the field of data processing, there is an ever increasing demand for graphics and full-motion video applications which are faster, more detailed, and generally more lifelike than their predecessors. Many of these applications are useful in commercial, educational, military, and personal data processing systems. In addition, the rapid acceleration of Internet applications is mandating high performance graphics and multimedia features in newly released computer systems.

High speed three-dimensional (3D) graphics processing requires fast, pipelined processing in order to provide realistic detail and to implement special effects, such as texture maps, lighting, alpha blending, and Z-buffering.

Texture maps provide life-like surfaces and shadows within a three-dimensional image. Lighting provides realistic approximations of the effect of light from various sources striking objects. Alpha blending allows two graphics objects to be blended together.

Z-buffering (or hidden surface removal) tracks the depth of objects or pixels to ensure that a minimum of processing is carried out on polygons which are hidden behind others in a scene. Z-buffering has become increasingly important in graphical processing systems, because the size and complexity of graphical databases have been growing for many 3D graphics applications. These 3D graphics models typically have high depth complexity, i.e. a given pixel is rendered many times due to many overlapping polygons, and only the polygon closest to the viewer ends up being visible.

Identifying and culling these occluded polygons represents a significant performance improvement opportunity. In general, low cost graphics accelerators have not yet been able to incorporate effective occlusion culling. Previously proposed occlusion culling algorithms have been too complex for integration into low cost architectures.

Graphics processing architectures must address both the computational load of transformations, texturing, and lighting, as well as the increasingly important bandwidth load of accessing the geometry, texture, and visibility data. To be commercially successful, graphics accelerators for personal computers must address these computation and bandwidth requirements while keeping the hardware cost very low.

High output bandwidth implies high cost memory for Z-buffering and for anti-aliasing (reducing stair-stepping or jagged lines that sometimes occur on a display screen). This cost can be kept down by using a tiled architecture that renders the scene one tile or chunk at a time and reuses the fast expensive memory for each tile.

The Z-buffer provides a basic hidden surface removal mechanism for graphics, accelerators used in personal computers, despite its lack of support for occlusion culling. Major performance improvements can be achieved by identifying and eliminating those polygons that cannot be seen from some regions of space. This saves the cost of rendering such polygons by scan converting, lighting, alpha-blending, shading, and/or texturing them.

Software algorithms are currently known for processing, including culling, polygons, in computer graphics systems. However, these algorithms have either required complex and costly computer hardware to implement, or they have provided unsatisfactory performance.

For the reasons stated above, there is a substantial need in the area of computer graphics processing to provide a graphics processing system which can render high depth complexity scenes while reducing both computational and bandwidth loads.

In addition, there is a substantial need in the area of computer graphics processing to provide computer graphics hardware which can efficiently perform high depth complexity graphics processing and which is relatively inexpensive to manufacture.

SUMMARY

Accordingly, in one embodiment of the invention there is provided a method for use in a processor adapted to be used in a graphical data processing system. The data processing system comprises a frame buffer and a Z-buffer. The method operates to cull occluded polygons from a scene being assembled in the frame buffer. The method comprises rendering the polygons in each tile of the scene in depth order, starting with a closest polygon, and storing their pixel depths in the Z-buffer. As polygons are rendered, an evaluation is made whether a coverage parameter has been satisfied and, if so, a hierarchical Z-buffer is constructed from the Z-buffer. Subsequent polygons are compared to the hierarchical Z-buffer to determine whether they are completely hidden and, if so, they are culled. Additional embodiments are described and claimed.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the disclosed subject matter.

The inventors, Feng Xie and Michael J. Shantz, published the following paper at the Siggraph/Eurographics Workshop on Graphics Hardware, on Aug. 9, 1999, in Los Angeles, Calif.: "Adaptive Hierarchical Visibility in a Tiled Architecture". This paper describes many of the concepts and implemention details of the present invention.

In one embodiment, this invention describes methods and apparatus for occlusion culling in a tiled 3D graphics hardware architecture. Adaptive hierarchical visibility (AHV) is a simplified method for occlusion culling that is integrated into a tiled architecture for hardware rendering. AHV constructs a list of polygon bins for each tile, where the bins are bucket-sorted in order of increasing depth or Z. Polygon bins are rendered starting with the bin closest to the viewer.

After some number of bins are rendered, a single layer, hierarchical Z-buffer (HZ) is constructed from the Z-buffer thus far accumulated for the rendered bins. Subsequent bins have their polygons tested against the HZ buffer to see if these polygons are hidden. If they are hidden, they are culled, resulting in a significant savings in processing.

AHV is simpler to implement in hardware and gives performance that matches or surpasses known progressive hierarchical visibility (PHV) methods which update the HZ buffer for each rendered pixel. Experimental modeling shows that AHV is superior on scenes with high depth complexity and small polygons. For tiles of widely ranging statistics, AHV competes surprisingly well with PHV. It offers dramatic performance improvement on low cost hardware for scenes of high depth complexity.

Figure 1:
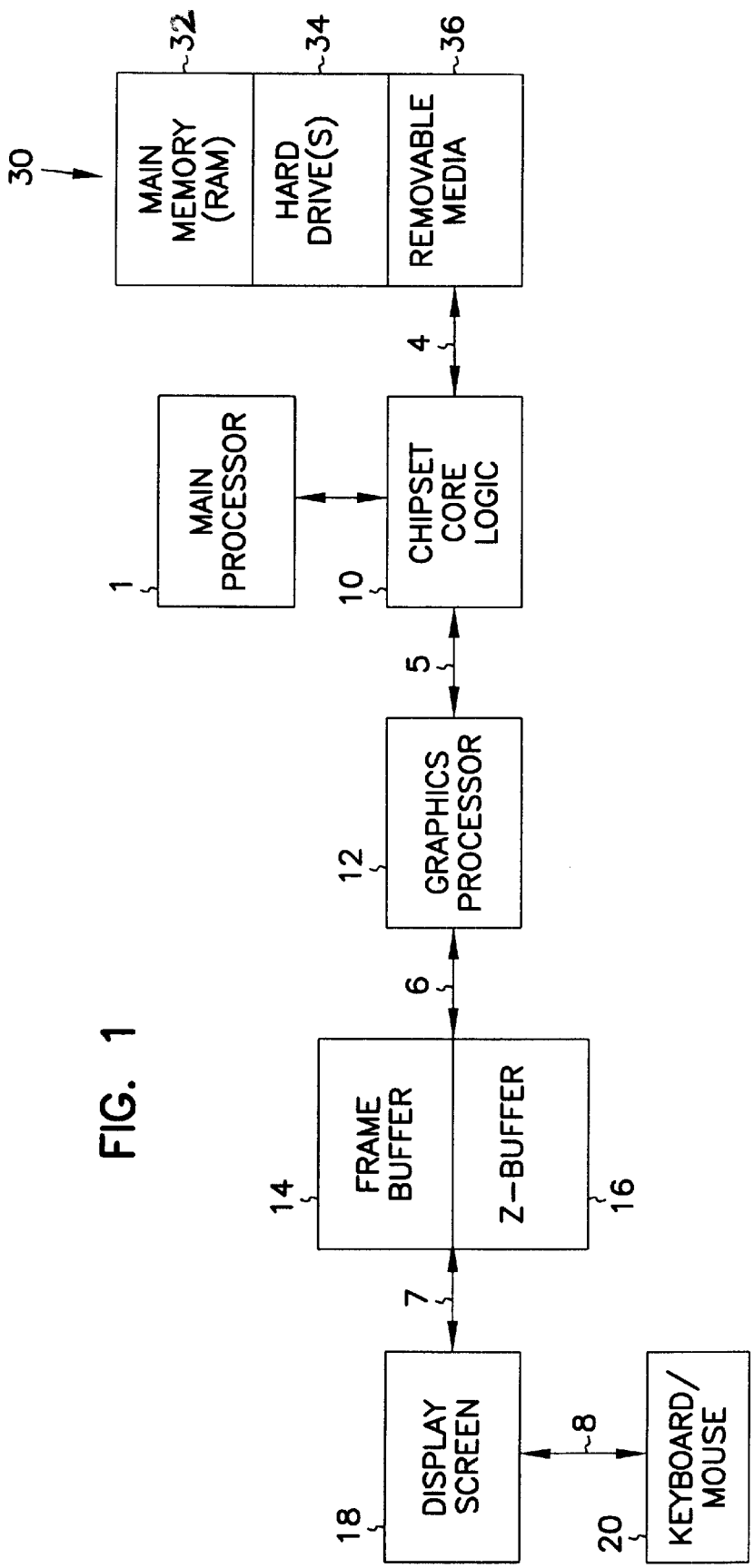
FIG. 1 illustrates a block diagram of a data processing system, including a graphics processor, in accordance with one embodiment of the invention.

FIG. 1 illustrates a block diagram of a data processing system, including a graphics processor, in accordance with one embodiment of the invention. The data processing system shown in FIG. 1 is capable of performing high performance 3D graphics processing. In one embodiment, the system comprises a main processor 1, chipset core logic 10, graphics processor 12, frame buffer 14, Z-buffer 16, display screen 18, keyboard/mouse 20, and memory 30. Memory 30 can comprise any suitable memory storage devices and in one embodiment includes main memory 32 implemented with random access memory (RAM) chips, one or more hard drive(s) 34, and removable media 36 such as magnetic or optical disks.

Processor 1 is coupled to chipset core logic 10 via bus 3. Chipset core logic 10 is coupled to graphics processor 12 via bus 5, and it is coupled to the frame buffer 14 and to the Z-buffer 16 via bus 6. Frame buffer 14 and Z-buffer 16 are coupled to display screen 18 via bus 7, and display screen 18 is coupled to keyboard/mouse 20 via bus 8.

Other user interface elements, such as audio speakers, microphone, joy stick, steering wheel, printer, MIDI (musical instrument digital interface) keyboard, virtual reality hood, movable seat and environment, and the like can form a part of the data processing system but have not been illustrated in FIG. 1 for the sake of clarity. Likewise, additional peripheral devices, such as audio and video equipment, modems, network and other I/O (input/output) interfaces, and the like can also form a part of the data processing system, but they too have been omitted from FIG. 1, because one of ordinary skill will understand how to utilize them in the broad spectrum of applications for which the data processing system can be employed.

It will be apparent to one of ordinary skill in the art that while busses such as busses 3–8 are shown as single lines in FIG. 1, they ordinarily will be implemented as multiple conductors. Alternatively they can be implemented in any other suitable transmission medium, such as wireless or fiber optic technology.

It will be apparent to one of ordinary skill in the art that the data processing system could include more or fewer processors than shown in FIG. 1. It will also be understood that the data processing system could function, although at a reduced level of performance, without graphics processor 12 and/or with the functions of frame buffer 14 and Z-buffer 16 being performed by a different memory and/or by main memory 32.

In one embodiment system processor 1 is an Intel® Pentium® III processor commercially available from Intel Corporation. The graphics processor 12 is an Intel® 740 graphics accelerator commercially available from Intel Corporation. The chipset core logic is an Intel® 440BX AGP chipset commercially available from Intel Corporation.

Main memory 32 can be implemented in any suitable commercially available memory system. In one embodiment main memory is implemented with synchronous dynamic random access memory (SDRAM) devices as, for example, in an Intel® 440BX motherboard commercially available from Intel Corporation. In one embodiment the computer software for implementing the AHV functions of the invention is embodied on an integrated circuit comprising at least one processor, such as graphics processor 12. However, alternatively some of the AHV computer software could reside in graphics processor 12, and some could reside in main processor 1. Alternatively, some or all of the AHV software could reside in main memory 32. The term "computer-readable medium", as used herein, means any device, whether active or passive, containing computer instructions for instructing a processor, and/or containing computer data, such as a hard disk, floppy disk, compact disk (CD), random access memory (RAM), or the like.

The AHV computer software can also be implemented by a different type of software module which can reside somewhere other than as described above and be executed by an execution unit (not shown) other than graphics processor 12 or system processor 1.

In one embodiment chipset core logic 10 can take the form of an Intel® 82460GX chipset which is expected to be commercially available from Intel Corporation.

The operation of the AHV software for culling occluded polygons will now be described.

Figure 2:
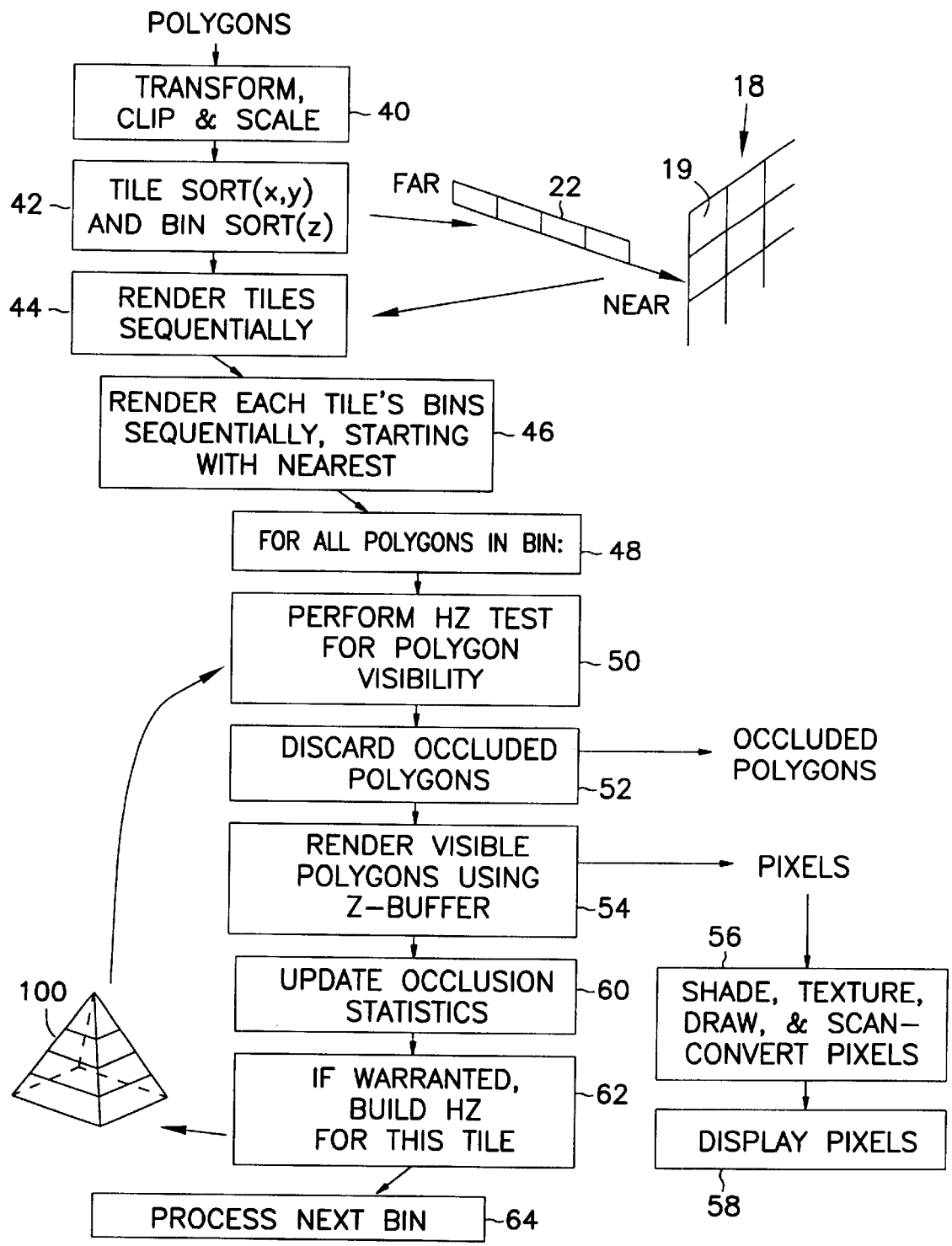
FIG. 2 illustrates a simplified schematic and flow diagram of a method for culling occluded polygons, in accordance with one embodiment of the invention.

FIG. 2 illustrates a simplified schematic and flow diagram of a method for culling occluded polygons, in accordance with one embodiment of the invention. FIG. 1 shows a generalized graphics rendering pipeline and the associated AHV data structures. The display screen 18 is partitioned into tiles 19. In one embodiment each tile is 128 by 128 pixels, although the size may be different based on memory costs and other factors.

In one embodiment the algorithm proceeds as follows.

In box 40, polygons in a scene are first transformed, clipped, and scaled, as appropriate, in a manner which is understood by those of ordinary skill in the art.

For a given point in time, a display frame is generated by sorting the polygons of the scene into the (x,y) tiles 19 that they overlap (box 42). The polygons for a tile are also sorted into bins 22 by depth Z using a bucket-sort.

The tiles are then rendered sequentially (box 44). To render a tile, each bin of polygons is rendered sequentially, starting with the nearest polygon bin (box 46). The nearest polygon bin is the bin of polygons having the smallest minimum Z value. Normally, all polygons in a bin are processed (box 48), although there is an "early bailout" condition (discussed below) which can cull all remaining polygons in a bin.

At box 50, if the HZ buffer 100 has already been constructed, each remaining polygon in that bin is tested against the HZ buffer 100. In box 52, any polygons determined to be occluded by the HZ buffer test are discarded.

Polygons which are determined to be visible, at least partially, by the HZ buffer test, are rendered (box 54). Rendered polygons are converted to pixels and stored in frame buffer 14 in a well-known manner. The pixels are shaded, textured, and/or drawn, as appropriate, and they are then scan-converted (box 56) and displayed on the display screen 18 (box 58). In box 60, polygon occlusion statistics are updated.

If the HZ buffer 100 has not yet been constructed at this point in time, then in box 62 a "visibility" test is performed to see whether constructing the HZ buffer 100 for this tile is warranted. If it is, the HZ buffer 100 is constructed, and it is used as mentioned above in box 50 to test subsequent polygons, first within this bin, and subsequently within other bins in this tile, for visibility.

If, at box 50, the HZ buffer 100 has not yet been constructed, then the polygon is simply rendered using the Z-buffer (box 54), and the operations performed by boxes 50, 52, and 60, as described above, are skipped. This continues until a "coverage" parameter in box 62 reaches a threshold value. Then the HZ buffer 100 is constructed from the Z-buffer. Polygons from subsequent bins undergo the visibility test (box 50) against the HZ buffer before they are rendered. They are not scan-converted or drawn if this test shows that they are completely hidden.

After all polygons for this bin have been processed, the algorithm then proceeds to the next bin, as indicated by box 64. When all bins for this tile have been processed, the algorithm then proceeds to the next tile, until all tiles for the display screen 18 have been processed.

The polygon-binning portion of the algorithm will now be described in more detail.

As mentioned above, in addition to dividing the screen into (x,y) tiles as in traditional chunking, each screen tile 19 is further bucket-sorted into bins 22 using a Z (depth) value. Each tile now has its own list of Z-sorted bins of polygons. For big polygons, exact triangle binning is performed using a computation of the intersection of the triangle with the tile. Exact binning for large triangles can reduce the computation and bandwidth overhead of overlap regardless of whether or not AHV is implemented.

The estimated Z value (EZ) used to sort a polygon is defined as the depth in Z-buffer coordinates of the nearest point of the polygon that exists within the (x,y) extent of the tile. If the polygon is entirely contained by the tile, the value is simply the smallest Z value of all the vertices. If the polygon is small, this value is still used even if the triangle straddles multiple tiles.

For the exact binning of big polygons, the Z value is the minimum Z of the intersection points of the triangle with the tile edges plus any triangle vertices lying within the tile. The (x,y) bounding box (Ebox) of the area of overlap between the triangle and the tile is computed as follows. If the triangle is small and straddles one or more tiles, the intersection of the triangle's bounding box with the tile is used. For large triangles the bounding box of the exact intersection between polygon and tile is used. The EZ and Ebox of the triangle will eventually be used for testing against the HZ buffer for occlusion.

The following pseudo-code can be used for the initial Z-sort which sorts the triangles initially into the bucket-sorted list for each tile.

For all triangles in the scene,
    Find the set of tiles that the triangle occupies or partially occupies.
    For all occupied tiles,
        If the triangle is small,
            Find the minimum Z value of the vertices of the triangle.
            Bucket-sort the triangle into the proper one of the list of polygon bins for the tile.
        Else,
            Clip the triangle to the tile. This yields a polygon that lies completely within the tile.
            Find the minimum Z value of all the vertices of this clipped triangle.
            Bucket-sort the clipped triangle into the proper one of the list of polygon bins for the tile.

The binning operation can also be implemented by the following pseudo-code which also accumulates depth distribution statistics and the total estimated overlap area of triangles within the tile. The total estimated overlap area is used later to determine whether and when to construct the HZ buffer. The depth distribution statistics are used in the next time sequential display frame to ensure better triangle distribution in the Z buckets by adjusting the Z depth boundaries (b.MinZ and b.MaxZ) of the bins so that all bins will likely have roughly equal numbers of polygons. This uses a frame-to-frame coherency assumption which assumes that polygon content rarely changes abruptly from frame to frame.

```
For each triangle, tri, in the scene {
    For each tile, tile, the triangle overlaps {
        Tri.EZ      = EstimateZ (tri, tile);
        Tri.Ebox.       = EstimateBox (tri, tile);
        Locate bin b in tile such that
            b.MinZ < EZ < b.MaxZ;
        b.AddTriangle (tri);
        tile.MeanZ         += tri.EZ;
        tile.StdZ          += tri.EZ * tri.EZ;
        tile.TotalArea += Ebox.Area;
    }
}
```

In traditional chunking the triangles' minimum and maximum values for x and y (MinMax(x,y)) are computed, giving an (x,y) bounding box for each triangle. With relatively little additional work the AHV algorithm also computes the following values and Z-sorts the triangles.

"EZ" represents the Estimated Z value of the triangle. This depth value is used for bucket-sorting polygons into bins. It is the nearest Z value of the portion of the triangle lying within the (x,y) extent of the tile (with the exception mentioned above for small triangles).

"MeanZ" represents the. Mean of the Estimated Z values of all the triangles in the tile.

"STDZ" represents the Standard Deviation of Estimated Z values of all triangles in the tile.

Once the polygons for a tile are Z-sorted into bins as described above, they are rendered starting with those in the nearest bin. The following pseudo-code can be used to implement the AHV algorithm according to one embodiment.

```
For each tile in the screen {
    numTriRendered=numTested=numOccluded=0;
    For tile bins b=b_0 to b_n {
        For each triangle tri in b {
            Vis=true;
            If (HZExist) {
            numTested++;
            Vis=HZVisQuery( tri.Sbox);
        }
```

```
If (Vis) {
    Render Triangle tri;
    UpdateIdealHZPlace( );
    numTriRendered++;
} Else,
    numOccluded++;
}
If (HZExist) {
    If ( ReachedIdeallZPlace( )) {
        If (tile. IsHZWorthWhile( ))
            ConstructHZ( );
    }
}
```

Setup minimum and maximum bucket boundaries in buckets in the tile using tile.MeanZ and tile.STDZ;

```
If ( numTested>0)
    HZOcclusionRate=numOccluded/numTested;
}
```

In the immediately foregoing pseudo-code "Vis" is a polygon visibility flag. The parameter UpdateIdealHZPlace( ) is used to locate the best place to construct the HZ buffer. Taking advantage of frame-to-frame temporal, coherence, we use the optimal coverage metric from the last frame. ReachedIdealHZPlace( ) is used to check if we have reached the ideal place to construct the HZ buffer as determined by an analysis of the previous frame and an optimal value calculated for the previous frame.

The IsHZWorthWhile( ) function returns the value of the following inequality:

$$(HZBuildCost+numTriangleTests*HZTestCost)<(numTriangle Tests*HZOcclusionRate*ScanConvertCost) \quad \text{[Equation 1]}$$

using the following definitions:

"HZBuildCost" is the cost of constructing the HZ buffer.

"numTriangleTests" is the number of triangles left to be rendered after the HZbuffer has been constructed. This is the number of triangles in the tile minus the number of triangles (occluders) already rendered when HZ buffer construction started, and minus the number of triangles rendered while the HZ buffer was being constructed.

"HZTestCost" is the cost of performing the HZ buffer test on the remaining polygons.

"HZOcclusionRate" is equal to the number of polygons determined to be occluded divided by the number of polygons tested by the HZ buffer.

"ScanConvertCost" is the cost of scan-converting the remaining polygons. It can be set to the AverageTriangleArea with a normalized Z-buffering cost of 1 per pixel.

HZTestCost is proportional to the AverageTriangleArea. That is, HZTestCost=Cppt*AverageTriangleArea, where "Cppt" is the desired cost per pixel of HZ buffer testing expressed as a fraction of the total cost of rendering a pixel in a standard Z-buffer architecture.

The above inequality (Equation 1) requires that the estimated cost of constructing the HZ buffer; plus the estimated cost of using it to test polygons, is less than the estimated cost of rendering the expected number of occluded polygons. So the HZ buffer is only built if it is likely to be useful, and this is determined by a simple computation.

The following represents definitions and pseudo-code for the functions UpdateIdealHZPlace( ) and ReachedIdealHZPlace() in the adaptive hierarchical visibility algorithm given above.

Definitions:

In the initial Z-sort phase, each triangle in the sorted list for a tile has its pixel area "tri.Ebox.Area" stored with it.

Also, the sum of the areas of all tri.Ebox.Areas for the tile is stored as "tile.TotalArea".

While rendering the tile's list of triangles, "Pixels_done" is the sum of the tri.Ebox.Areas rendered so far. "Pixels_Remaining" equals tile.TotalArea minus Pixels_done. "Coverage" is the fraction of the tile's pixels that have been touched at least once. Every time a pixel is painted that has never been painted before during this frame, the coverage increases. So coverage equals the number of fresh_Z_ writes/tile_size in_pixels.

$$\text{"HZ\_Test\_Cost"}=Cppt*AverageTriangleArea=(\tfrac{1}{16})*(tile.TotalArea/tile.TotalTriangles) \quad \text{[Equation 2]}$$

$$\text{"CoverageExpr"}=(Pixels\_remaining)*(Coverage - HZ\_Test\_Cost) \quad \text{[Equation 3]}$$

"FOPR" is the fraction of pixels rendered so far and is given by Pixels_done/tile.TotalArea.

"CoverageExprMax" is set to zero at the beginning of tile processing.

"Fmax" is the fraction of pixels rendered when CoverageExpr has its maximum value.

"FmaxLast" is Fmax saved from the last display frame.

The following function, expressed in pseudo-code, keeps track of the FOPR for which CoverageExpr is a maximum and stores it in Fmax. When the tile is finished, Fmax is copied to FmaxLast.

```
UpdateIdealHZPlace( )
{
    Compute CoverageExpr;
    if(CoverageExprMax<CoverageExpr) {
        CoverageExprMax=CoverageExpr;
        Fmax=FOPR;
    }
}
```

The following pseudo-code simply tests whether we have reached the FOPR that turned out to be the best one during the last frame.

```
ReachedIdealHZPlace( )
{
    if(FOPR>=FmaxLast)
        return True;
    else
        return False;
}
```

A high level overview of a method for culling occluded polygons using HV will now be discussed.

Figure 3A:
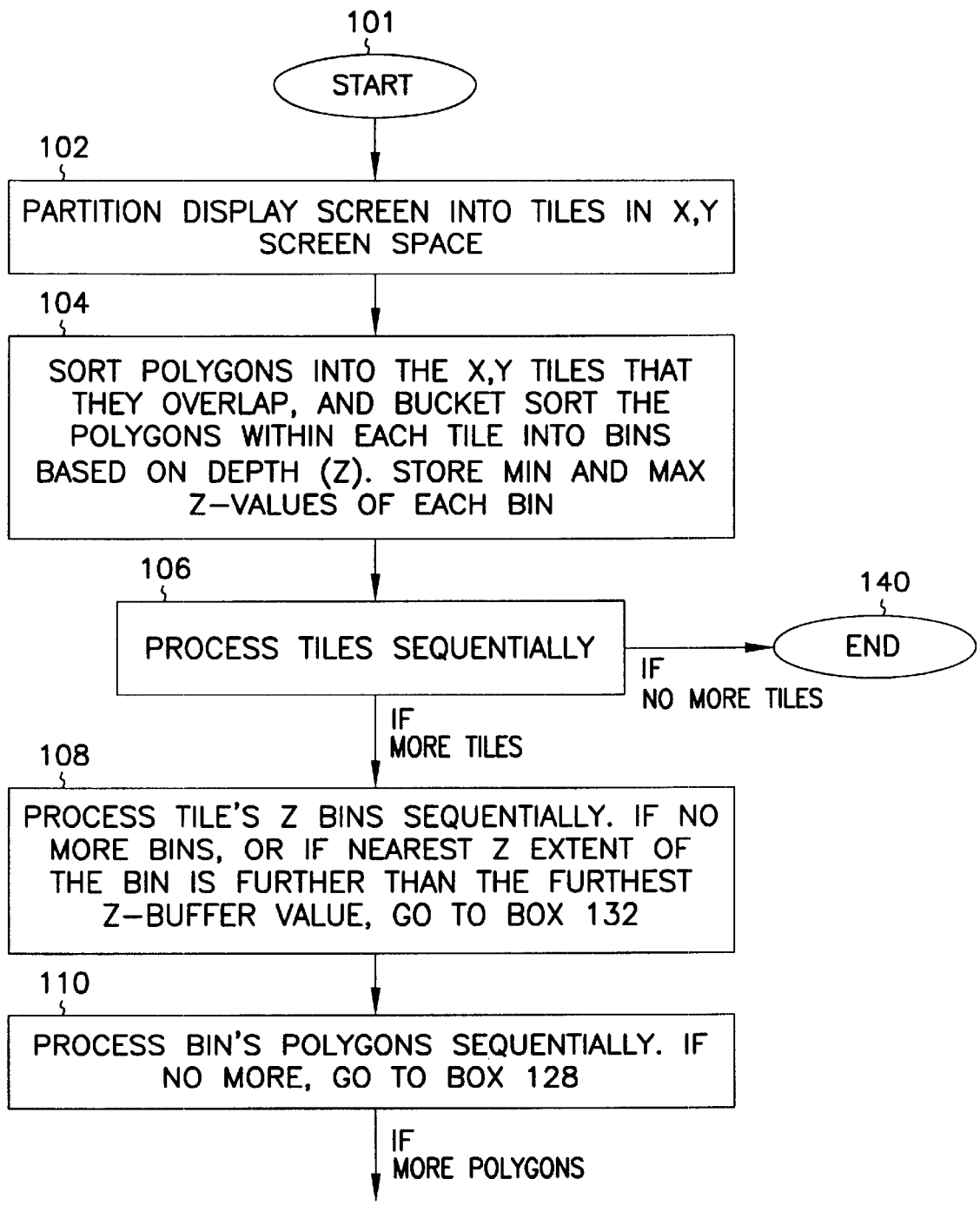
FIGS. 3A–3C illustrate a flow diagram of a method for culling occluded polygons, in accordance with one embodiment of the invention.
Figure 3B:
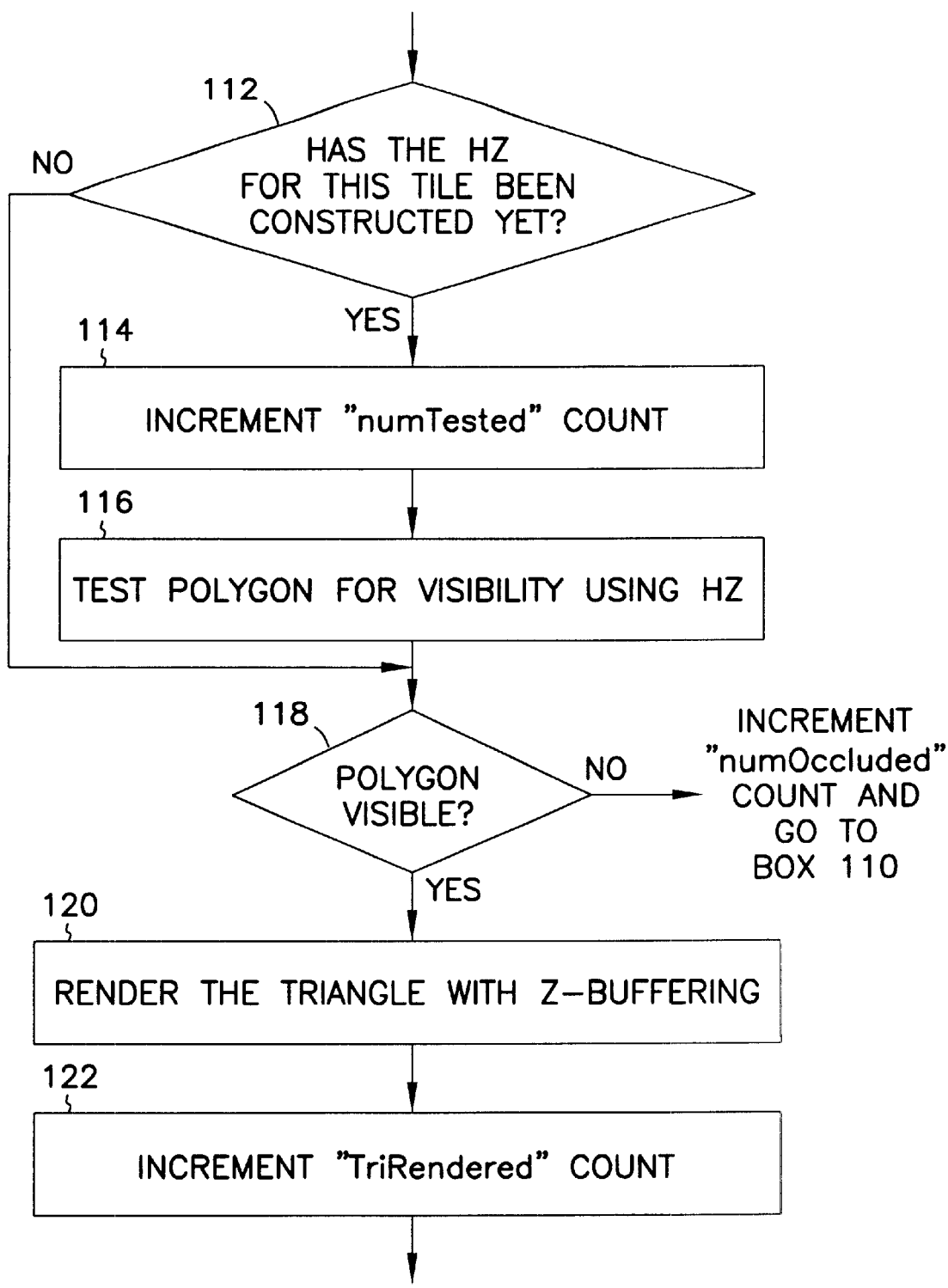

FIGS. 3A–3B illustrate a flow diagram of a method for culling occluded polygons, in accordance with one embodiment of the invention.

The process begins in box 101. In box 102 the display screen 18 is partitioned into tiles in (x,y) screen space. Next in box 104, polygons are sorted into the (x,y) tiles that they overlap. Within each tile the polygons are bucket-sorted into bins based on depth Z. In an alternative embodiment, the minimum and maximum Z values for all polygons in the bin are also stored.

In box 106, the tiles of display screen 18 are processed sequentially. If there are no more tiles to process, the process ends in box 140. Otherwise, it proceeds to box 108, where a tile's Z bins are processed sequentially. If there are no more Z bins to process, the process goes to box 132. The process also goes to box 132, in an "early bailout" mode as mentioned earlier, if the nearest Z extent of the bin is further than the furthest Z-buffer value in the tile, indicating that no further polygons in this bin are visible. If there-are more Z bins to process, and "early bailout" mode hasn't been reached yet, then the process proceeds to box 110.

In box 110, this bin's polygons are processed sequentially. If there are no more polygons, the process goes to box 128; otherwise, it goes to decision box 112.

In decision box 112, a determination is made whether the HZ buffer has been constructed yet for this tile. If so, the process goes to box 114; if not, it goes to decision box 118.

In box 114, the "numTested" count is incremented, and the process goes to box 116, where the polygon is visibility tested using the HZ buffer 100. If in decision box 118 the polygon is visible, the process goes to box 120, where the polygon is rendered with the Z-buffer; otherwise, the "numOccluded" count is incremented, and the process goes to box 110.

From box 120 the process goes to box 122, where the number of triangles rendered ("triRendered") count is incremented, and it then proceeds to box 124.

In box 124, the ideal FOPR (Fraction of Polygons Rendered) Fmax for constructing the HZ buffer 100 is updated.

In box 126, the "coverage" expression is updated, and the process goes to box 110.

Decision box 128 is reached from box 110. If the HZ buffer 100 hasn't been constructed yet, a determination is made whether the parameter "IdealPlace" has been reached yet. If not, the process goes back to box 108; otherwise, it goes to box 130.

In box 130, if the parameter "WorthWhile" is true, then the HZ buffer 100 is built. In either case, whether the HZ buffer 100 is built or not, the process goes to box 108:

Box 132 is reached from box 108. This tile's bucket Z ranges are optimized for the next tile using the parameters "MeanZ" and "STNDZ".

Next, in box 134, the "HZOcclusionRate" count is incremented, and in box 136 the process returns to box 106.

Figure 3C:
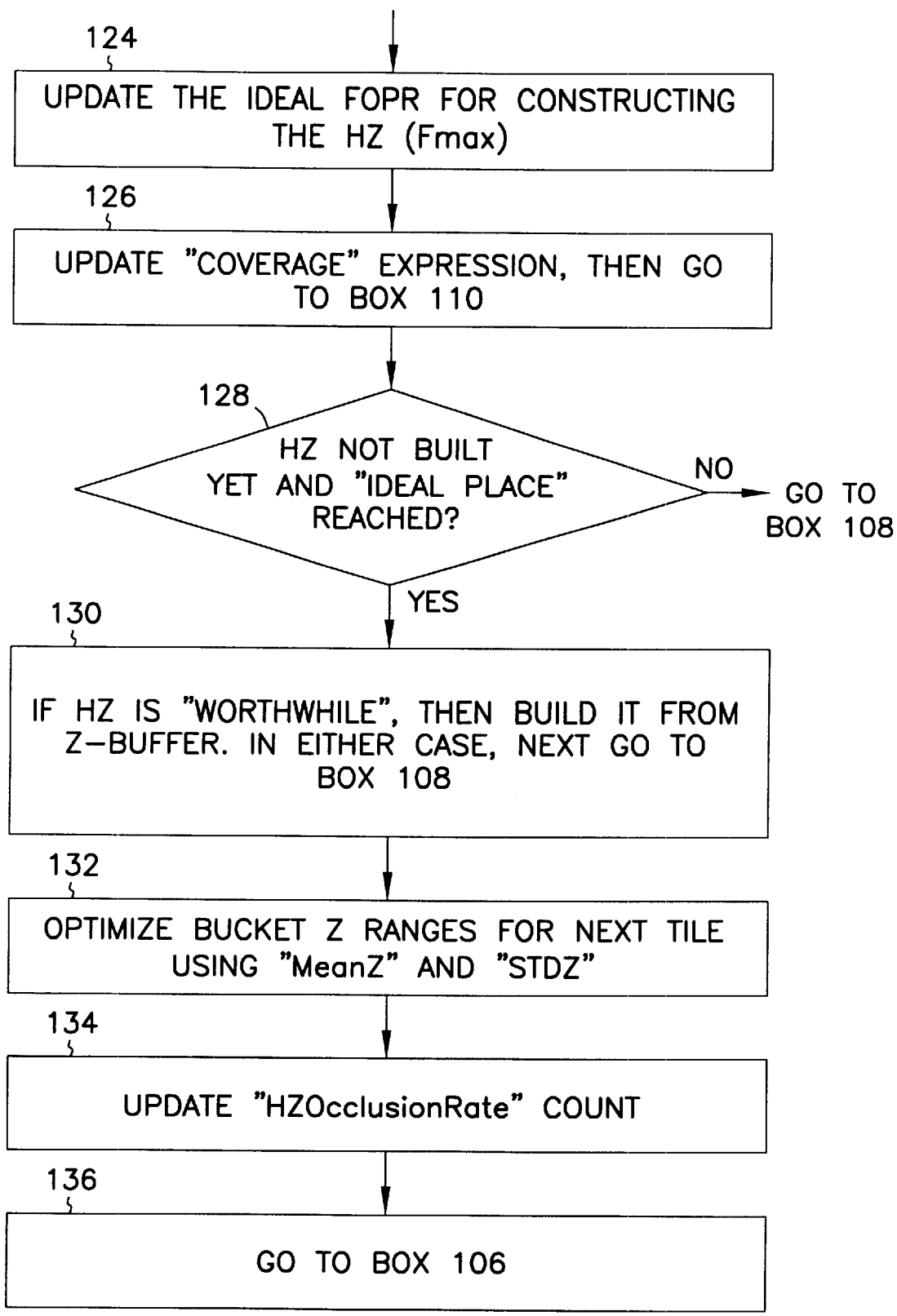

It will be understood by those skilled in the art that the steps of the above-described method can be carried out in any appropriate order and need not necessarily be executed in the order described with reference to FIGS. 3A–3C.

The construction of HZ buffer 100 will now be described.

Figure 4:
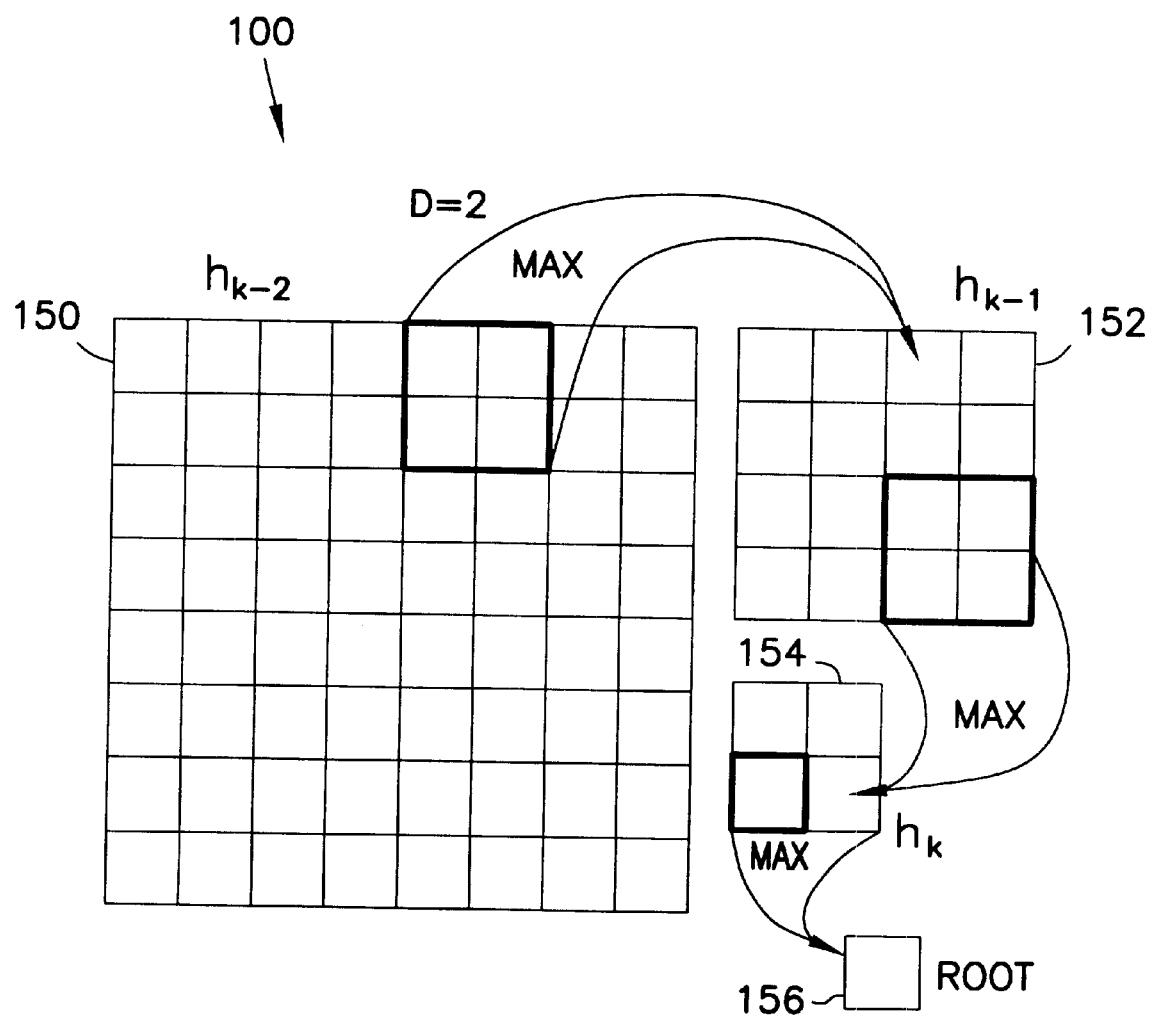
FIG. 4 illustrates a schematic diagram showing how a hierarchical Z-buffer is constructed, in accordance with one embodiment of the invention.

FIG. 4 illustrates a schematic diagram showing how a hierarchical Z-buffer 100 is constructed, in accordance with one embodiment of the invention.

After some number of bins of triangles for the current tile are rendered using a standard Z-buffer, the HZ buffer 100 is computed in the following manner.

Let $h_0(i,j)$ be the Z-buffer array for a tile of size 128×128. The HZ buffer 100 shown in the embodiment depicted in FIG. 4 has four levels: an 8-by-8 level 150, a 4-by-4 level 152, a 2-by-2 level 154, and a 1-by-1 level 156, representing the root of the hierarchical Z-buffer tree.

The HZ buffer at level k is computed from Equation 4:

$$h_k(i, j) = \max_{a=0, b=0}^{a=D-1, b=D-1} (h_{k-1}(Di + a, Dj + b))$$ [Equation 4]

where D is the degree of the HZ buffer. In the embodiment shown, D is assumed to be 2. Each level k has values that are the maximum of the values in a D-by-D region of the previous level k−1, as shown in. FIG. 4. The root of this hierarchy is a single pixel 156 containing the maximum Z or furthest point of the scene in the tile.

A function HZVisQuery(Sbox) is needed that can test a triangle against the HZ buffer 100 to see if it is completely hidden. The Sbox of a triangle is the (x,y) screen coordinate bounding box of the portion of the triangle inside the tile (Ebox) together with its minimum Z value EZ.

HZVisQuery first computes L, the level in the HZ buffer 100 to test the Sbox for visibility. Secondly, HZVisQuery tests the box against level L. For a simple architecture, it is desirable to only compute one level of the HZ buffer 100 and to test every polygon's visibility using only this level. The level L to construct and use is determined by the desired cost of visibility testing using Equation 5:

$$L = \log_D(\text{sqrt}(1/\text{Cppt}))$$ [Equation 5]

where Cppt is the desired cost per pixel of HZ buffer testing expressed as a fraction of the total cost of rendering a pixel in a standard Z-buffer architecture. In Equation 5, "logn" is the logarithmic function, which calculates log to the base "n", and "sqrt" is the square-root function.

For example, regarding Equation 5, if we wish to spend 1/16 as much time per pixel on HZ buffer testing as on rendering, then Cppt is 1/16. A polygon covers n pixels at the lowest level, $n/D^2$ at the next, and so on. A visibility test at level L need only test the number of HZ buffer elements that the polygon covers at that level. Testing a polygon at level L fixes the HZ buffer per pixel test cost at a . constant. If the pyramid is of degree D=2, choosing Cppt=1/16, gives L=2, and choosing Cppt=1/256 gives L=4. After the selection of L, the triangle is tested against level L of HZ buffer as follows:

For each pixel in level L of the HZ buffer covered by Sbox
{
if (PixelZ>MinZ)
return true;
}
return false;

This technique of selecting a level L for testing is well suited to hardware pipelining; because it constrains the triangle occlusion test cost to a prescribed perpixel fraction of pixel Z-buffering cost.

Much of the visibility culling benefit is obtained with the AHV algorithm, which constructs the HZ buffer once, at some selected point, and then uses it for subsequent visibility testing. AHV constructs the HZ buffer from the Z-buffer once, based on an adaptive, pixel coverage value that exploits frame-to-frame coherence. This has advantages, as mentioned earlier, over a progressive hierarchical visibility (PHV) algorithm, which updates the HZ buffer with each pixel rendered, thus making a significant impact on the rendering pipeline.

The "coverage" parameter that is used to determine the proper place to construct the HZ buffer will now be discussed.

When polygons are sorted in depth order, the rate of occlusion (the fraction of triangles being occluded) is roughly proportional to the accumulated coverage the fraction of the tile's pixels that have been hit). When accumulated coverage is one, updates to the HZ buffer increase total cost, without improving occlusion culling.

"Coverage" is computed during rendering by counting the number of fresh Z-buffer writes (a write into a Z-buffer element that was cleared). The HZ buffer is constructed when the fraction of polygons rendered (FOPR) for this tile and this frame reaches the optimal fraction computed for the previous frame. More precisely, during the previous frame we compute and save the FOPR, $F_{max}$, for which the following expression was a maximum, (Pixels_re maining)*(Coverage−HZ_Test_Co st) [Equation 6]

where "Pixels_remaining" is the sum of all polygon areas still to process. If the "Coverage" is quite high and many pixels remain, then the occlusion savings will likely be high. If there is good temporal coherence, then the ideal fraction computed during the last frame will also be a good estimation for the ideal place to construct the HZ buffer this frame. So when the current frame FOPR reaches $F_{max}$, the HZ buffer is constructed.

The tile coverage times the remaining pixels reaches a clear maximum as an increasing fraction of the polygons are rendered. This is approximately the optimal point at which to construct the HZ buffer in order to minimize total rendering cost.

For scenes with medium to high depth complexity, the cost savings of AHV over traditional Z-buffering depends on selecting the right place to construct the HZ buffer.

The optimal HZ buffer construction point happens when Cah (the visibility cost for AHV) is at a minimum, or when the savings of Cah over Czb (the cost for Z-buffering) is greatest, since Czb is fixed at Tp (the total number of pixels of all of the triangles within the tile). We use Csav to denote the saving of Cah over Czb:

$$Csav = Czb - Cah \quad \text{[Equation 7]}$$
$$= Tp - p_{HZ} - (Tp - p_{HZ})(Cppt + V(p_{HZ})) -$$
$$HZBuildCost$$
$$= (Tp - p_{HZ})(1 - V(p_{HZ}) - Cppt) -$$
$$HZBuildCost$$

In Equation 7, "$P_{HZ}$" is the number of pixels tested by the Z-buffer before HZ buffer is built.

Since HZBuildCost is constant, maximizing Csav is equivalent to maximizing $(Tp-p_{HZ})(1-V(p_{HZ})-Cppt)$. In this formula, Tp, $p_{HZ}$ and Cppt are well defined and measurable. $V(p_{HZ})$ is hard to measure locally because it is defined as the probability that pixel $p_{HZ}$ is visible if pixels $0 \ldots p_{HZ}-1$ are rendered. To measure V(p) accurately for some p, we need to summarize the probability over all pixels after p and compute the expected value. It is impossible to do this within a frame. An alternative approach would be to estimate V(p), by computing it for the next N pixels. Unfortunately, the next N pixels can give an incorrect estimate of the distribution of pixels to follow and lead to a local minimum that gives poor global performance. Instead, the following expression involving the coverage function Cov is maximized, $$(TP-p_{HZ})(COV(p)-Cppt) \quad \text{[Equation 8]}$$

where Cov(p) is defined as the ratio of the number of non-empty pixels in the tile after pixels $0 \ldots p$ are rendered over the total number of non-empty pixels in the tile after all pixels are rendered. Cov(p) is a good approximation to 1−V(p), since it is clearly the case that the bigger the coverage at p, the bigger the probability that pixels after p will be occluded. In fact, as triangles approach the size of a single pixel, V(p)=1−Cov(p).

As all the terms in Equation 8 are easily measured while rendering the triangles in frame n, we can find the fraction of polygons rendered (FOPR) for which Equation 8 is a maximum in frame n. This ideal FOPR or $F_{max}$ for frame n is saved, and when frame n+1 is processed the HZ buffer is built when the FOPR reaches $K*F_{max}$, and it is deemed to be worthwhile.

Various data structures are stored in one or more components of the data processing system illustrated in FIG. 1. One data structure comprises a first block of data regarding a plurality of polygons from a tiled scene which have been sorted by tile and by depth. It also comprises a second block of data regarding polygons which have been rendered in depth order starting with a polygon closest to a viewer of the scene. In addition, it comprises a third block of data comprising coverage data and a coverage parameter pertaining to the rendered polygons. It also comprises a fourth block of data representing a hierarchical ordering of data regarding the rendered polygons, the fourth block of data being constructed only if the coverage parameter reaches a threshold value.

Conclusion

In conclusion, embodiments of the invention present a simple and effective occlusion-culling method for graphics hardware.

In one embodiment, the invention provides an adaptive hierarchical visibility algorithm (AHV) integrated into a tiled hardware graphics pipeline architecture. For each tile, it automatically and adaptively selects portions of the model as occluders using a bucket-sort by depth Z. A hierarchical Z-buffer is constructed after accumulating critical coverage within the tile.

Critical coverage is a simple heuristic that exploits frame-to-frame visibility coherence. This hierarchy is built and used for visibility testing only if a simple test indicates that it will be worthwhile. The method is simple enough for low cost hardware implementation yet effective enough to give significant performance improvement in scenes of high depth complexity.

Compared to a traditional Z-buffer method, AHV can reduce both the computation and bandwidth costs. Compared to a deferred shading pipeline (where the texturing and shading are not computed if the Z-buffer test fails), AHV can reduce the computation cost with little additional bandwidth cost.

In one embodiment, the invention provides an adaptive hierarchical visibility (AHV) algorithm that can significantly reduce the computational cost for scan-converting triangles. The AHV algorithm has several advantages, which will be briefly summarized.

The AHV algorithm is readily adaptive, both to existing graphics-rendering architectures and to scenes of varying depth complexity. Tiled architectures sort in image space to facilitate cache coherence in the frame-buffer and Z-buffers. This increases geometry bandwidth while reducing frame-buffer and Z-buffer bandwidth. AHV takes advantage of this sorting stage even further to sort the triangles according to their depth Z, using a bucket-sort that does not further increase geometry bandwidth. For each tile AHV gathers statistics regarding the distribution of the depth and the triangle area. These statistics are used later to determine whether it is worthwhile to construct the occlusion map and, if so, to decide when it should be built to minimize total rendering cost.

The AHV algorithm takes advantage of frame-to-frame coherence in the following ways:

(1) For each tile, the depth distribution of frame n is used to ensure good distribution of triangles in the Z buckets in frame n+1.

(2) For each tile, polygon or pixel coverage statistics from frame n are used to decide when to construct the HZ buffer for frame n+1. The maximum of coverage times remaining pixels is found in frame n. The corresponding percentage, of triangles rendered is saved and used to decide when to construct the HZ buffer in frame n+1. Since temporal coherence increases as frame rate increases, this attribute is likely to become increasingly important in future graphics systems.

One of the advantages which embodiments of the invention provide in the context of a tiled architecture is that while binning a triangle into (x,y) tiles, the triangle can be binned into Z buckets for almost no additional cost, either in the processor(s) or in the graphics pipeline. Bucketing in Z offers a good depth sort and a good method for occluder selection.

Because depth complexity is typically not evenly distributed over the whole screen, in a tiled architecture the HZ buffer can be adaptively invoked just when it is needed.

The disclosed invention can be modified in numerous ways and can assume many embodiments other than those specifically set out and described above. For example, one optimization (referred to above as "early bailout") which can be applied while rendering the polygons for any given tile is to store in the Z-buffer the maximum Z value of any polygon rendered thus far. When the tile becomes fully covered, the polygons of any subsequent Z-bucket (polygon bin) whose minimum Z value exceeds the maximum Z-buffer value can be culled, because all of these polygons will be occluded.

In addition, pixel processing within a chunk can be aborted when the chunk fails the HZ buffer test. The occlusion rate or occlusion effectiveness of the AHV algorithm drops as the average triangle size of the scene increases. This is due to the fact that AHV is rejecting at the triangle level. The larger the triangle, the wider the depth range across the triangle, and the less likely the bounding box test will pass. A simple optimization can be done to increase the occlusion rate for AHV for scan converters that generate pixels in 4×4 chunks. For such scan converters, each 4×4 chunk yields one HZ test (when the HZ buffer has degree 4). The pixel processing within a chunk is aborted when the chunk fails the HZ buffer test. This optimization significantly increases occlusion rates in scenes with large triangles.

Also, alternative binning strategies could provide advantages, e.g. where triangles are sorted by a weighted sum of area and depth, since this could enable earlier construction of the HZ buffer and a better occlusion rate.

Embodiments of the invention may be implemented in other specific forms. The present embodiments are therefore to be considered in all respects as illustrative and not restrictive, the scope of embodiments of the invention being indicated by the appended claims rather than by the foregoing description, and all changes which come within the meaning and range of equivalency of the claims are therefore intended to be embraced therein.

What is claimed is:

1. A method for use in a processor to be used in a data processing system comprising a frame buffer and a Z-buffer, the method operating to cull occluded polygons from a scene being assembled in the frame buffer and comprising:
    rendering polygons in the scene in depth order, starting with a closest polygon, and storing them in the Z-buffer;
    as polygons are rendered, evaluating whether a coverage parameter has been satisfied and if so, constructing a hierarchical Z-buffer from the Z-buffer; and
    comparing subsequent polygons to the hierarchical Z-buffer to determine whether they are occluded and if so, culling them;
    wherein the coverage parameter is proportional to an estimated cost of constructing and using the hierarchical Z-buffer less an estimated cost of rendering an expected number of occluded polygons.

2. The method of claim 1, wherein the coverage parameter represents the maximum value of the fraction of polygons rendered during a previous frame.

3. The method of claim 1, wherein the scene is partitioned into tiles, and wherein the coverage parameter represents an optimal fraction of the polygons that have been rendered (Fmax) for a tile and a frame based on an analysis of a previous frame.

4. The method of claim 3, wherein Fmax is the fraction of polygons that had been rendered (FOPR) during the previous frame for the tile when the following coverage expression reached its maximum:
    Pixels_remaining*(Coverage−HZ_Test_Cost),
    where Pixels_remaining=the sum of all polygon areas still to process,
    Coverage=the number of fresh Z-buffer writes, and
    HZ_Test_Cost=Cppt*AverageTriangleArea,
    where Cppt is the desired cost per pixel of hierarchical Z-buffer testing, represented as a fraction of the total cost of rendering a pixel with just a Z-buffer, and
    AverageTriangleArea=the average triangle area.

5. The method of claim 1, wherein the hierarchical Z-buffer is not constructed unless the cost of constructing and using the hierarchical Z-buffer is less than the cost of rendering an expected number of occluded polygons.

6. The method of claim 1, wherein the operations are performed in a different order.

7. A method for use in a data processing system comprising a processor, a Z-buffer, a frame buffer, and a display screen, the method operating to cull occluded polygons from a scene being assembled in the frame buffer for display on the display screen and comprising:
    sorting polygons in the scene by tile and by depth;
    rendering the tiles sequentially and storing them as pixels in the frame buffer while performing the following operations for each tile:
        rendering polygons in depth order, starting with a closest polygon, and storing them in the Z-buffer;
        as polygons are rendered, evaluating whether a coverage parameter has been satisfied and, if so, constructing a hierarchical Z-buffer from the Z-buffer, but if not, rendering them;
        comparing subsequent polygons to the hierarchical Z-buffer to determine whether they are occluded and if so, culling them, but if not, rendering them; and
    using the contents of the frame buffer to display the scene on the display screen;
    wherein the coverage parameter is proportional to an estimated cost of constructing and using the hierarchical Z-buffer less an estimated cost of rendering an expected number of occluded polygons.

8. The method of claim 7, wherein the hierarchical Z-buffer is a single layer.

9. The method of claim 8, wherein the coverage parameter represents an optimal fraction of the polygons that have been rendered (Fmax) for a tile and a frame based on an analysis of a previous frame.

10. The method of claim 9, wherein Fmax is the fraction of polygons that had been rendered (FOPR) during the previous frame for the tile when the following coverage expression reached its maximum:
    Pixels_remaining*(Coverage−HZ_Test_Cost),
    where Pixels_remaining=the sum of all polygon areas still to process,
    Coverage=the number of fresh Z-buffer writes, and
    HZ_Test_Cost 32 Cppt*AverageTriangleArea,
    where Cppt is the desired cost per pixel of hierarchical Z-buffer testing, represented as a fraction of the total cost of rendering a pixel with just a Z-buffer, and AverageTriangleArea=the average triangle area.

11. The method of claim 7, wherein the operations are performed in a different order.

12. A processor to execute a computer program comprising the operations of:
   rendering polygons in a scene in depth order, starting with a closest polygon, and storing them in a Z-buffer;
   as polygons are rendered, evaluating whether a coverage parameter has been satisfied and if so, constructing a hierarchical Z-buffer from the Z-buffer; and
   comparing subsequent polygons to the hierarchical Z-buffer to determine whether they are occluded and if so, culling them;
   wherein the coverage parameter is proportional to an estimated cost of constructing and using the hierarchical Z-buffer less an estimated cost of rendering an expected number of occluded polygons.

13. The processor of claim 12, wherein the scene is partitioned into tiles and the scene is assembled as a frame in a frame buffer coupled to the processor, and wherein the coverage parameter represents an optimal fraction of the polygons that have been rendered (Fmax) for a tile and a frame based on an analysis of a previous frame.

14. The processor of claim 13, wherein Fmax is the fraction of polygons that had been rendered (FOPR) during the previous frame for this tile when the following coverage expression reached its maximum:
   Pixels_remaining*(Coverage−HZ_Test_Cost),
   where Pixels_remaining=the sum of all polygon areas still to process,
   Coverage=the number of fresh Z-buffer writes, and
   HZ_Test_Cost=Cppt*AverageTriangleArea,
   where Cppt is the desired cost per pixel of hierarchical Z-buffer testing, represented as a fraction of the total cost of rendering a pixel with just a Z-buffer, and
   AverageTriangleArea=the average triangle area.

15. The processor of claim 12, wherein the hierarchical Z-buffer is not constructed unless the cost of constructing and using the hierarchical Z-buffer is less than the cost of rendering an expected number of occluded polygons.

16. An integrated circuit for use in a system rendering a scene on a display screen, the scene comprising a plurality of polygons of varying depth, the integrated circuit comprising at least one processor to execute a computer program culling occluded polygons from the scene and comprising the operations of:
   rendering polygons in the scene in depth order, starting with a closest polygon, and storing them in a Z-buffer;
   as polygons are rendered, evaluating whether a coverage parameter has been satisfied and if so, constructing a hierarchical Z-buffer from the Z-buffer; and
   comparing subsequent polygons to the hierarchical Z-buffer to determine whether they are hidden and if so, culling them;
   wherein the coverage parameter is proportional to an estimated cost of constructing and using the hierarchical Z-buffer less an estimated cost of rendering an expected number of occluded polygons.

17. A data processing system to execute a computer program comprising the operations of:
   sorting polygons in a scene by tile and by depth;
   rendering the tiles sequentially and storing them as pixels in a frame buffer while performing the following operations for each tile:
      rendering polygons in depth order, starting with a closest polygon, and storing them in a Z-buffer;
      as polygons are rendered, evaluating whether a coverage parameter has been satisfied and, if so, constructing a hierarchical Z-buffer from the Z-buffer, but if not, rendering them;
      comparing subsequent polygons to the hierarchical Z-buffer to determine whether they are occluded and if so, culling them, but if not, rendering them; and
      using the contents of the frame buffer to display the scene on a display screen;
      wherein the coverage parameter is proportional to an estimated cost of constructing and using the hierarchical Z-buffer less an estimated cost of rendering an expected number of occluded polygons.

18. The system of claim 12, wherein the coverage parameter represents the maximum value of the fraction of polygons rendered (FOPR) during a previous frame.

19. The system of claim 12, wherein the coverage parameter represents an optimal fraction of the polygons that have been rendered (Fmax) for a tile and a frame based on an analysis of a previous frame.

20. The system of claim 19, wherein Fmax is the fraction of polygons that had been rendered (FOPR) during the previous frame for the tile when the following coverage expression reached its maximum:
   Pixels_remaining*(Coverage−HZ_Test_Cost),
   where Pixels_remaining=the sum of all polygon areas still to process,
   Coverage=the number of fresh Z-buffer writes, and
   HZ_Test_Cost=Cppt*AverageTriangleArea,
   where Cppt is the desired cost per pixel of hierarchical Z-buffer testing, represented as a fraction of the total cost of rendering a pixel with just a Z-buffer, and
   AverageTriangleArea=the average triangle area.

21. The system of claim 20, wherein the operations are performed in a different order.

22. A computer-readable medium containing computer instructions to instruct a processor to perform a method of culling polygons from a scene being rendered for display, the instructions comprising:
   rendering polygons in the scene in depth order, starting with a closest polygon;
   storing the rendered polygons;
   as polygons are rendered, evaluating whether a coverage parameter has been satisfied and if so, constructing a hierarchical Z-buffer from the stored polygons; and
   comparing subsequent polygons to the hierarchical Z-buffer to determine whether they are occluded and if so, culling them;
   wherein the coverage parameter is proportional to an estimated cost of constructing and using the hierarchical Z-buffer less an estimated cost of rendering an expected number of occluded polygons.

23. A computer-readable medium having computer-executable instructions culling occluded polygons from a scene comprising:
   rendering polygons in the scene in depth order, starting with a closest polygon;
   storing the rendered polygons in a Z-buffer;
   as polygons are rendered, evaluating whether a coverage parameter has been satisfied and if so, constructing a hierarchical Z-buffer from the Z-buffer; and
   comparing subsequent polygons to the hierarchical Z-buffer to determine whether they are occluded and if so, culling them;

wherein the coverage parameter is proportional to an estimated cost of constructing and using the hierarchical Z-buffer less an estimated cost of rendering an expected number of occluded polygons.

24. A computer-readable medium having stored thereon a data structure comprising:
- a first block of data regarding a plurality of polygons from a tiled scene which have been sorted by tile and by depth;
- a second block of data regarding polygons which have been rendered in depth order starting with a polygon closest to a viewer of the scene;
- a third block of data comprising coverage data and a coverage parameter pertaining to the rendered polygons, wherein the coverage parameter is proportional to an estimated cost of constructing and using a hierarchical Z-buffer to determine whether polygons are occluded less an estimated cost of rendering an expected number of occluded polygons; and
- a fourth block of data representing the hierarchical Z-buffer, the fourth block of data being constructed only if the coverage parameter reaches a threshold value.

* * * * *

UNITED STATES PATENT AND TRADEMARK OFFICE
CERTIFICATE OF CORRECTION

PATENT NO. : 6,525,726 B1
DATED : February 25, 2003
INVENTOR(S) : Feng Xie and Michael J. Shantz It is certified that error appears in the above-identified patent and that said Letters Patent is hereby corrected as shown below:

Title page,
Item [56], References Cited, U.S. PATENT DOCUMENTS, insert the following
-- US 6,359,623 * 3/2002 Larson, Ronald D.    345/421 --
OTHER PUBLICATIONS, insert the following:
-- Greene, N., et al., "Hierarchical Z-Buffer Visibility", Computer Graphics Proceedings, Annual Conference Series, 1993, 231-238, (Aug. 1-6, 1993)
Xie, F., et al., "Adaptive Hierarchical Visibility in a Tiled Architecture", Siggraph/ Eurographics Workshop on Graphics Hardware, Los Angeles, CA, 11 pgs., (Aug. 9, 1999)
Zhang, H., et al., "Visibility Culling Using Hierarchical Occlusion Maps", Computer Graphics Proceedings, Annual Conference Series 1997, 77-88, (Aug. 3-8, 1997) --
"Article Titled "Preprocessing" reference, delete "in" after "Symposium" and insert -- on -- therefor.

Column 1,
Line 9, delete "The invention relates" and insert -- Embodiments of the invention relate -- therefor.
Line 66, delete "," after "graphics".

Column 2,
Line 7, delete "," after "polygons".

Column 6,
Line 31, delete "." after "Tri.Ebox".
Line 50, delete "." after "the".

Column 7,
Line 3, delete "UpdateldealHZPlace( );" and insert -- UpdateIdealHZPlace( ); -- therefor.
Line 8, insert -- ! -- before "HZExist".
Line 9, delete "ReachedIdeallZPlace( )" and insert -- ReachedIdealHZPlace( ) -- therefor.
Line 22, delete "UpdateldealHZPlace( )" and insert -- UpdateIdealHZPlace( ) -- therefor.
Line 24, delete "," after "temporal".
Line 25, delete "ReachedldealHZPlace( )" and insert -- ReachedIdealHZPlace( ) -- therefor.
Line 63, delete "ReachedldealHZPlace()" and insert -- ReachedIdealHZPlace( ) -- therefor.

Column 8,
Line 9, delete "fresh_Z_writes/tile_size in_pixels" and insert -- fresh_Z_writes/tile size_in_pixels -- therefor.
Line 26, delete "UpdateldealHZPlace( )" and insert -- UpdateIdealHZPlace( ) -- therefor.
Line 38, delete "ReachedldealHZPlace( )" and insert -- ReachedIdealHZPlace( ) -- therefor.
Line 46, delete "HV" and insert -- AHV -- therefor.
Line 65, delete "there-are" and insert -- there are -- therefor.

UNITED STATES PATENT AND TRADEMARK OFFICE
CERTIFICATE OF CORRECTION

PATENT NO. : 6,525,726 B1
DATED : February 25, 2003
INVENTOR(S) : Feng Xie and Michael J. Shantz It is certified that error appears in the above-identified patent and that said Letters Patent is hereby corrected as shown below:

Column 9,
Line 58, delete "." after "in".

Column 10,
Line 15, delete "$^1/_{16}$as" and insert -- $^1/_{16}$ as -- therefor.
Line 20, delete "." after "a".
Line 21, delete "Cppt=$^1/_{256}$gives" and insert -- Cppt=$^1/_{256}$ gives -- therefor.
Line 30, delete ";" after "piplining" and insert -- , -- therefor.
Line 49, insert -- ( -- before "the fraction".
Line 61, delete "(Pixels_re maining)*(Coverage-HZ_Test_Co st) and insert
-- (Pixels_remaining)*(Coverage-HZ_Test_Cost) -- therefor.

Column 11,
Line 39, delete "," after "V(p)".
Line 29, insert "the" after "before".
Line 45, delete "($TP$-p$_{HZ}$)(COV($p$)-Cppt)" and insert -- ($TP$-p$_{HZ}$)(Cov($p$)-Cppt) --, therefor.

Column 12,
Line 63, delete "," after "percentage".

Column 14,
Line 51, delete "claim 8" and insert -- claim 7 -- therefor.
Line 64, delete "32" and insert -- = -- therefor.

Column 16,
Lines 15 and 19, delete "claim 12" and insert -- claim 17 -- therefor.

Signed and Sealed this

Twenty-first Day of June, 2005

JON W. DUDAS
*Director of the United States Patent and Trademark Office*